(12) United States Patent
Kumar (10) Patent No.: US 7,928,663 B1
(45) Date of Patent: Apr. 19, 2011

(54) LIGHTING DIMMER ADAPTABLE TO FOUR WIRING CONFIGURATIONS

(75) Inventor: Russikesh Kumar, Hoboken, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 167 days.

(21) Appl. No.: 12/503,391

(22) Filed: Jul. 15, 2009

Related U.S. Application Data (63) Continuation-in-part of application No. 12/072,315, filed on Feb. 26, 2008, now Pat. No. 7,609,007.

(51) Int. Cl.
 *H05B 41/16* (2006.01)
(52) U.S. Cl. ......... 315/246; 315/272; 315/291; 315/352
(58) Field of Classification Search .................. 315/119, 315/224, 246, 253, 272, 288, 291, 294, 307, 315/326, 352; 323/237–246, 282, 288, 325, 323/365, 905; 307/112, 115
See application file for complete search history.

(56) References Cited

U.S. PATENT DOCUMENTS

| | | | |
|---|---|---|---|
| 4,728,866 A | 3/1988 | Capewell | |
| 4,876,498 A | 10/1989 | Luchaco | |
| 5,430,356 A | 7/1995 | Ference | |
| 5,471,116 A * | 11/1995 | Schiller | 315/209 R |
| 6,091,205 A | 7/2000 | Newman | |
| 6,294,901 B1 * | 9/2001 | Peron | 323/239 |
| 7,230,391 B2 * | 6/2007 | Ravindra et al. | 315/219 |
| 7,482,758 B2 * | 1/2009 | Hua et al. | 315/119 |
| 7,687,940 B2 * | 3/2010 | Mosebrook et al. | 307/131 |
| 2006/0255745 A1 | 11/2006 | DeJonge | |
| 2007/0001654 A1 | 1/2007 | Newman | |
| 2008/0024074 A1 | 1/2008 | Mosebrook | |
| 2008/0111501 A1 | 5/2008 | Dobbins | |
| 2009/0039854 A1 | 2/2009 | Blakeley | |

* cited by examiner

*Primary Examiner* — Douglas W Owens
*Assistant Examiner* — Tung X Le

(57) ABSTRACT

A lighting dimmer (52) adaptable to four wiring configurations is capable of use in serial or parallel lighting circuits and in place of two-way or three-way switches. The dimmer operates in series when one active input wire (H) is connected and in parallel when two active input wires (H, N) are connected. The dimmer is operated in place of a two-way switch by connecting one output wire (DH1) and in place of a three-way switch by connecting two output wires (DH1, DH2).

6 Claims, 6 Drawing Sheets

LIGHTING DIMMER ADAPTABLE TO FOUR WIRING CONFIGURATIONS

CROSS REFERENCE TO RELATED APPLICATIONS

This application is a continuation-in-part of application U.S. Ser. No. 12/072,315, filed on Feb. 26, 2008, now U.S. Pat. No. 7,609,007 and which is hereby incorporated by reference.

BACKGROUND OF THE INVENTION

1. Technical Field

The present invention relates to a load control device and more specifically to a lighting dimmer that is operable when connected either in parallel or in series with an electrical load and is further adaptable as a replacement for a three-way switch.

2. Background Art

It is known to those skilled in the art, that standard 120 VAC residential wiring provides three conductors (e.g. wires) to which an installer can attach various equipment, such as lighting dimmers. It is also known that two of these three conductors are active current carrying conductors, meaning that connections to these active conductors are required to complete a functional circuit. The US National Electrical Code specifies, for 120 VAC residential wiring, that a first active conductor with significant voltage to earth ground be identified as a 'hot' (H) conductor and color-coded black and that a second active conductor near ground potential be identified as a 'neutral' (N) conductor and color-coded white. US National Electrical Code further specifies, for 120 VAC residential wiring, a third (passive) safety ground (G) conductor not normally used to carry circuit current and color-coded as green or as a bare uninsulated conductor.

Dimmers are devices used to vary the brightness of a lamp typically by modulating the duty cycle of the supplied AC power, such as by controlling a triac to turn on only after waiting for a period time has elapsed since a zero-crossing and allowing the triac to turn off at the next zero crossing. Although such phase control devices can be used for various purposes, the term dimmer is generally reserved for those intended to control lighting. By decreasing or increasing the AC duty cycle and hence the mean power to the lamp it is possible to vary the intensity of the light output from the lamp. Such a variable duty cycle AC voltage output is controlled by a dimmer, referenced to neutral (N), and is identified as a 'dimmer hot' (DH) active conductor.

Figure 1:
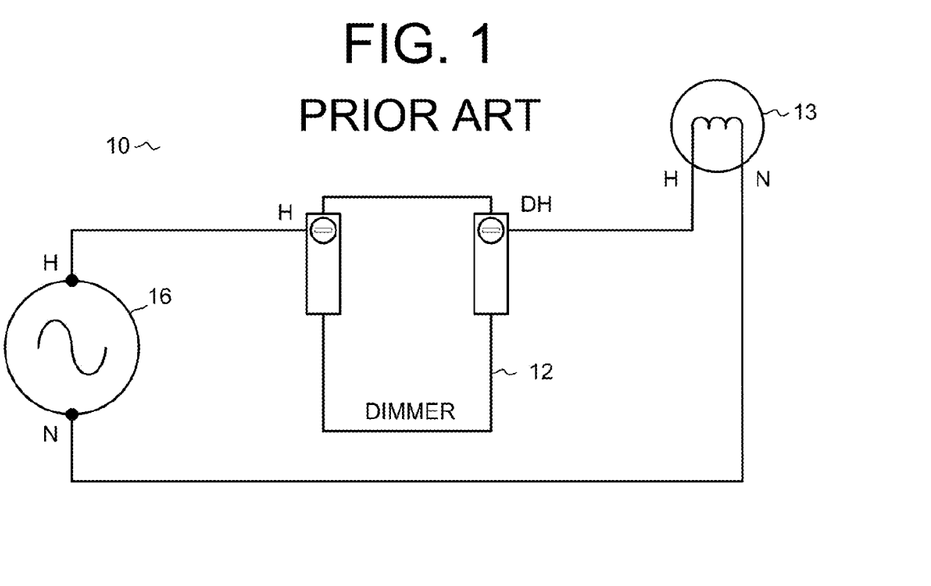
FIG. 1 depicts a dimmer installed serially and suitable for use in place of a two-way switch that has been used in the prior art.
Figure 2:
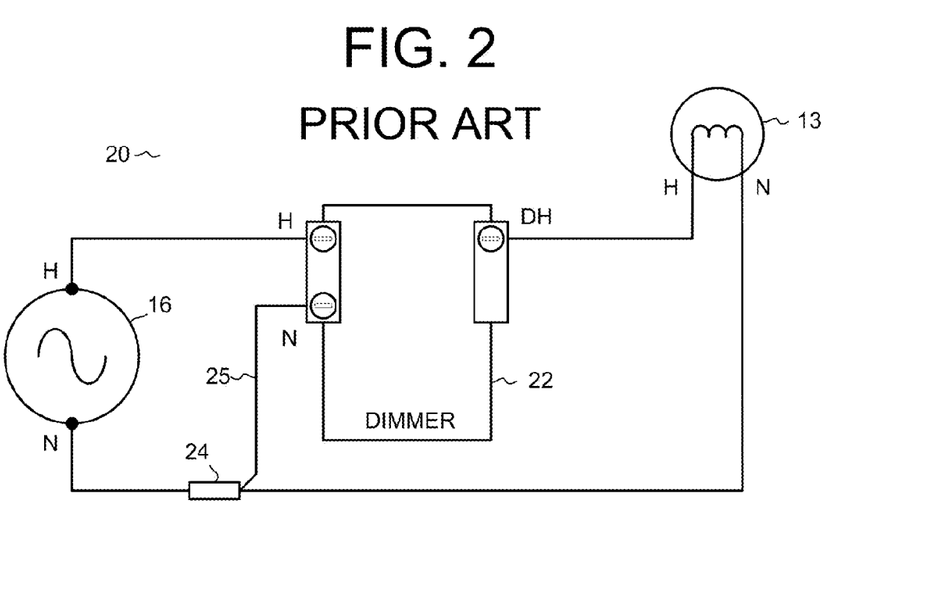
FIG. 2 depicts a dimmer installed in parallel and suitable for use in place of a two way switch that has been used in the prior art.

There are two ways to power lighting dimmers designed as replacements for standard two-way switches that are known in the prior art. Prior art FIG. 1 illustrates a dimmer with one active input wire and a prior art FIG. 2 illustrates a dimmer with two active input wires. As shown in prior art FIG. 1, the dimmer with one active input wire 12 is installed such that its internal power supply is sourced in series with the lighting load 13 to be dimmed, such as for example, an incandescent lamp. For descriptive purposes herein, dimmers with one active input wire are also referred to as serially installed dimmers, serially sourced dimmers or some variation thereof. As shown in prior art FIG. 2, the dimmer with two active input wires 22 is installed such that its internal power supply is sourced directly from the hot (H) and neutral (N) line voltages of the AC voltage source 16. Dimmers with two active input wires are hereafter also referred to as parallel installed dimmers, parallel sourced dimmers or some similar variation thereof. Dimmers sourced in series with the lighting load 12 are more prevalent in renovation work because they can be installed as direct replacements for standard wall switches without modifying the associated residential house wiring. Dimmers sourced in parallel 22 are typically used in new construction and in electrical upgrades where a neutral wire is available.

Figure 3:
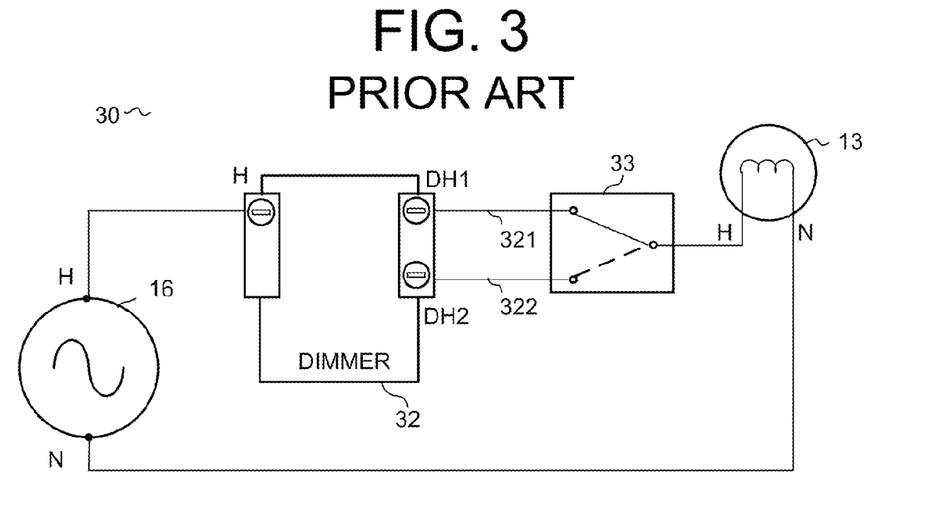
FIG. 3 depicts a dimmer installed serially and suitable for use in place of a two-way switch or three way switch that has been used in the prior art.
Figure 4:
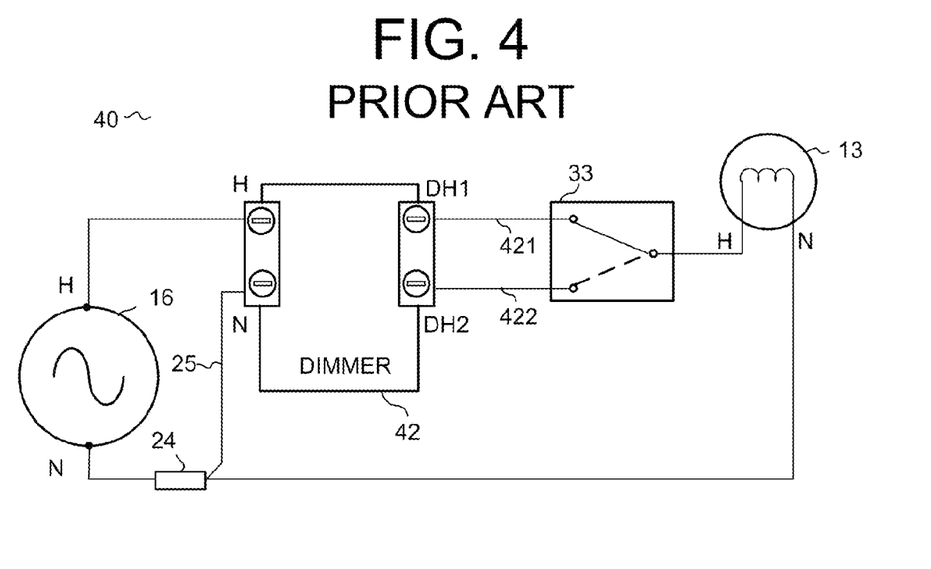
FIG. 4 depicts a dimmer installed in parallel and suitable for use in place of a two-way switch or three-way switch that has been used in the prior art.

Similarly, there are two ways to power lighting dimmers that are designed to replace three-way switches. Prior art FIG. 3 illustrates a dimmer with one active input wire and two active output wires designed for use in place of a three-way switch, as disclosed in Blakely (U.S. Pat. App. 2009/0039854). Prior art FIG. 4 illustrates a dimmer with two active input wires and two active output wires designed for use in place of a three-way switch, also disclosed in Blakely. It is important to note that the prior art does not recognize that combined serial/parallel implementation can be achieved.

Standard on-off switches, known in the industry as two-way switches or more formally as single-pole single-throw switches (SPST), are the simplest type of switch employed in lighting circuits and allow for a modest level of load control. Three-way switches 33, commonly implemented as single-pole double-throw (SPDT) switches, are employed in more complex wiring schemes where it is desirable to have more than one control point for the external load 13. For example, a pair of three-way switches wired in series with a load provides two control points. It is known to those skilled in the art that by inserting one or more four-way switches, commonly implemented as double-pole double-throw (DPDT) switches, between a pair of three-way switches the number of control points for the circuit can be extended indefinitely. Each four-way switch adds one additional location where the load can be controlled. If a neutral (N) wire 25 is available in the wall box, the parallel sourced dimmer with two active output wires 42 shown in prior art FIG. 4 can replace a single three-way switch. If no neutral (N) wire 25 is available in the wall box, the serially sourced dimmer with two active output wires 32 shown in prior art FIG. 3 can replace a single three way switch.

Prior art FIG. 1 shows common residential wiring practice when a dimmer replaces an existing two-way switch when there is no neutral (N) wire 25 present in the residential wall box. In this case, a dimmer 12 is serially connected between the AC source 16 hot (H) conductor and the lighting load 13 hot (H) conductor. The dimmer 12 hot (H) conductor connects to the AC power source 16 hot (H) conductor and the dimmer hot (DH) conductor from the serially installed dimmer 12 connects to the hot conductor (h) of the lighting load 13. In this wiring scheme 10, the serially sourced internal power supply 12 can only charge when there is a voltage across the dimmer 12. For example, when a switching device internal to the serially installed dimmer 12, such as an internal triac, is not conducting a voltage will be present across the dimmer 12 and the internal power supply can charge.

The charging path for the serially sourced dimmer 12 power supply is from AC source 16 hot, the dimmer 12 exiting as dimmed hot (DH), through the lighting load 13, and then returning to AC source 16 neutral (N). Therefore, to charge its internal power supply, the dimmer 12 internal switching device must be non-conducting for a portion of each AC half cycle. This limits the maximum lighting level of the light load 13 and also limits the maximum load resistance that can be connected. Typically, connecting a lighting load 13 less than 50 watts at 120 VAC causes problems when charging the serially sourced dimmer 12 power supply at high end (e.g. maximum light level). This problem is exacerbated for dimmers with one active input wire that require additional current draw, such as those containing radio transceivers or other components.

Refer now to prior art FIG. 2. When a neutral (N) wire 25 is present in a wall box, such as in new construction, it is desirable to connect a dimmer with two active input wires 22 between the AC source 16 hot (H) and neutral (N) conductors and the lighting load 13 because the dimmer internal power supply is always connected to a power source. Such a neutral wire 25 can be provided at the wall box by inserting a splice 24 into the circuit neutral wiring to the lighting load 13. Variable voltage, with respect to circuit neutral (N) is provided from the three-active-wire dimmer 22 as a dimmed hot (DH) output to the lighting load 13 hot (H) conductor. Advantageously, in this configuration 20 a power supply, internal to the three-active-wire dimmer 22, will always be able to charge up through the hot (H) to neutral (N) path thus eliminating constraints on high end (maximum light output) and minimum load wattage. The neutral (N) wire 25 connection also provides a means to obtain an accurate zero crossing signal from the AC source 16. The neutral (N) wire 25 connection also allows a parallel installed dimmer 22 to operate as a full-on/full-off electronic switch since the output can go to full conduction. Such a full-on/full-off mode is desirable if the lighting load is replaced with a general appliance, such as an electric fan.

Refer now to prior art FIG. 3. In addition to the AC source 16 hot (H) connection, the prior art lighting dimmer 32 has two dimmer hot (DH1, DH2) connections which are each connected to a corresponding pole of a three-way switch 33. Advantageously, the addition of the second dimmer hot (DH2) connection and its corresponding control circuitry provides two possible conductive paths 321, 322 from the AC power source 16 to the lighting load 13, each corresponding to a three-way switch 33 position. It should be noted that in this circuit 30 the internal power supply is sourced in series with the load 13. Therefore, those skilled in the art will recognize that the same disadvantages of the serially sourced dimmer 11 shown in prior art FIG. 1, limitations on maximum lighting level and maximum load resistance, apply to this dimmer 32 as well.

Prior art FIG. 4 illustrates a residential lighting circuit 40 with a parallel sourced lighting dimmer 42 coupled to a three-way switch 33. In addition to the AC source hot (H) connection and the neutral (N) connection, the dimmer 42 has two dimmer hot (DH1, DH2) connections which are each connected to a corresponding pole of the three-way switch 33. Just as in the prior art dimmer shown in FIG. 3, the addition of the second dimmer hot (DH2) connection and its corresponding control circuitry provides two possible conductive paths 421, 422 from the AC power source 16 to the lighting load 13, each corresponding to a position of the three-way switch. However, because there are two active input wires, the internal power supply is always able to charge up through the hot (H) to neutral (N) path thus eliminating constraints associated with serially installed dimmers.

One of the specific problems in the field is that each of these dimmers is designed for use in one respective wiring configuration and is not easily configurable for use in another configuration. For instance, a prior art dimmer with one active input and one active output is a suitable replacement for an existing two-way switch but cannot be used in place of a three-way switch and is not desirable in new constructions where parallel sourced dimmers may be installed. Installers must suffer the cost and complexity associated with stocking multiple dimmer types.

In response to this problem, certain manufacturers have developed manually configurable dimmers with a neutral (N) wire connection that can either be connected to AC source neutral (N) (providing two active input wires) or externally connected to the lighting load along with the dimmed hot (DH) wire (providing one active input wire). When these manually configurable dimmers operate with one active input wire, the neutral (N) wire needs to be connected to the lighting load hot (H) wire along with the dimmed hot (DH) wire to ensure a symmetrical flow of current through the lighting load when the internal power supply is charging. This is necessary especially for magnetic load types, such as low voltage transformers, because charging up asymmetrically can lead to heating in the transformer coil which can damage the transformer. Charging asymmetrically also limits the ability for the manually configurable dimmer internal power supply to charge fully.

During installation, those skilled in the art will recognize that a manually configurable dimmer can be set to operate in the above described serial configuration by adding an external jumper between the neutral (N) and dimmer hot (DH) terminals. Typically, this additional external jumper connection is simple to make as flying wire leads from the dimmer can be connected appropriately using wire nuts. However, it is still desirous for lighting dimmers to employ screw terminals similar to those found on standard light switches, such as a light switch being replaced by said dimmer, to make installation easier. In such an easier installation, the dimmer would be a drop-in replacement for the switch being removed and would not require bulky wire nuts to be squeezed into the residential wall box. These desired screw terminals pose a problem with making the external jumper connection between the neutral (N) terminal and the dimmed hot (DH) terminal of the manually configurable dimmer known in the prior art. The external jumper would still be needed to configure the manually configurable dimmer into a two-wire mode as in the equivalent dimmer with flying leads but when screw terminals are introduced, this external jumper is likely to be ignored or misapplied by the installer resulting in faulty operation or failure of the device.

SUMMARY OF THE INVENTION

The following summary of the invention is provided to facilitate an understanding of some of the innovative features unique to the present invention. A full appreciation of the various aspects of the invention can only be gained by taking the entire specification, claims, drawings, and abstract as a whole.

To solve the aforementioned problems associated with using a single-type dimmer for both parallel and serial dimming installations and as a replacement for both two and three way switches, the present invention is a unique, simple and reliable dimmer 52 adaptable to either one or two active input wires. The inventive lighting dimmer draws power in series with a load when one active input wire is connected and in parallel with the load when two input wires are connected. Further, the invention also integrates improvements known in the prior art which enable a standard dimmer to be used as a replacement for both two-way and three-way switching schemes. The inventive dimmer can be wired with either one or two output wires connected depending on the type of switch it is replacing.

In all modes of operation, the power supply charges symmetrically in both half cycles and prevents DC current from flowing through the load.

According to a first aspect, the present invention provides a lighting dimmer adaptable for installation in one of four active wiring configurations without modification. Depending on the availability of a neutral (N) wire 25 and the type of switches employed in the circuit, the dimmer may be connected to three wires consisting of: AC line hot (H), AC line neutral (N), and a first dimmer hot (DH1) wire, four wires consisting of: AC line hot (H), AC line neutral (N), a first dimmer hot wire (DH1) and a second dimmer hot wire (DH2); three wires consisting of: AC line hot (H), a first dimmer hot (DH1) wire and a second dimmer hot (DH2) wire; or two wires consisting of: AC line hot (H) and a first dimmer hot (DH1) wire. The lighting dimmer is further comprised of an internal power supply, an energy storage device (C1), a first control circuit, a second control circuit, a first full-wave rectifier, a second full-wave rectifier and a third full wave rectifier. The energy storage device (C1) is associated with, and provides power to the internal power supply. The two control circuits are powered by the internal power supply and switch ON and OFF a conductive path between the AC line hot (H) connection and the dimmer hot (DH1, DH2) connection corresponding to that control circuit. The first full-wave rectifier converts an alternating current input voltage present between the AC line hot (H) connection and the AC line neutral (N) connection into DC voltage to charge the energy storage device (C1). This alternating current input voltage between the AC line hot (H) connection and the AC line neutral (N) connection is present only when the dimmer is directly connected to both AC source (H, N) active wires. The second full-wave rectifier converts the alternating current input voltage present between the AC line hot (H) connection and the first dimmer hot (DH1) connection into DC voltage to charge the energy storage device (C1). This alternating current input voltage between the AC line hot connection and the first dimmer hot (DH1) connection is present when the control circuit is providing a nonconductive electrical path (e.g. switched OFF) between the AC line hot (H) connection and the first dimmer hot (DH1) connection and when an external load is connected between the first dimmer hot (DH1) connection and the AC line neutral return. The third full wave rectifier converts the alternating current input voltage present between the AC line hot (H) connection and the second dimmer hot (DH2) connection into DC voltage to charge the energy storage device (C1). This alternating current input voltage between the AC line hot (H) connection and the second dimmer hot (DH2) connection is present when the control circuit is providing a nonconductive electrical path (e.g. switched OFF) between the AC line hot (H) connection and the second dimmer hot (DH2) connection and when an external load is connected between the second dimmer hot (DH1) connection and an external AC line neutral return.

According to a second aspect, the present invention provides a lighting dimmer adaptable for installation in one of four active wiring configurations without modification. Depending on the availability of a neutral wire (N) and the type of switches employed in the circuit, the dimmer may be connected to three wires consisting of: AC line hot (H), AC line neutral (N), and a first dimmer hot (DH1) wire, four wires consisting of: AC line hot (H), AC line neutral (N), a first dimmer hot wire (DH1) and a second dimmer hot wire (DH2), three wires consisting of: AC line hot (H), a first dimmer hot (DH1) wire and a second dimmer hot (DH2) wire or two wires consisting of: AC line hot (H) and a first dimmer hot (DH1) wire. The light dimmer is further comprised of a first means of drawing electrical power from between the AC line hot (H) connection and the AC line neutral (N) connection when the dimmer is connected to three active wires, a second means of drawing electrical power from between the AC line hot (H) connection and the first dimmer hot (DH1) connection when an external load is connected between the first dimmer hot connection (DH1) and an AC line neutral return, a third means of drawing electrical power from between the AC line hot (H) connection and the second dimmer hot (DH2) connection when an external load is connected between the second dimmer hot (DH2) connection and an AC line neutral return, a first control circuit powered by the first and second means and operably connected between the AC line hot (H) connection and the first dimmer hot (DH1) connection and a second control circuit powered by the first and third means and operably connected between the AC line hot (H) connection and the second dimmer hot (DH2) connection.

The present invention seeks to overcome or at least ameliorate one or more of several problems, including but not limited to, the present need to stock multiple part numbers and the incompatibility of current dimmers with multiple wiring configurations. It aims to achieve this goal by providing a inventive dimmer that can automatically adapt to serial or parallel installation without modification and be installed in lighting circuits with three-way switches.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

BRIEF DESCRIPTION OF DRAWINGS

The accompanying figures further illustrate the present invention.

BRIEF DESCRIPTION OF THE SEVERAL VIEWS OF THE DRAWING

LIST OF REFERENCE NUMBERS FOR THE MAJOR ELEMENTS IN THE DRAWING

The following is a list of the major elements in the drawings in numerical order.

| | |
|---|---|
| 10 | serially installed dimmer 12 in place of two-way switch (prior art) |
| 12 | dimmer with one active input wire (prior art) |
| 13 | lighting load |
| 16 | AC power source |
| 20 | dimmer 22 installed in parallel in place of two way switch (prior art) |
| 22 | dimmer with two active input wires (prior art) |
| 24 | splice (to residential lighting circuit neutral) |
| 25 | neutral wire (for three-wire dimmer) |
| 30 | serially installed dimmer 32 coupled to three-way switch 33 (prior art) |
| 32 | dimmer with one active input wire suitable for use in place of three-way switch 33 (prior art) |
| 33 | three-way switch |
| 40 | parallel installed dimmer 42 coupled to three-way switch 33 (prior art) |
| 42 | dimmer with two active input wires suitable for use in place of three way switch 33 (prior art) |
| 50 | inventive dimmer 52 installed in place of two way switch |
| 52 | inventive dimmer |
| 60 | inventive dimmer 52 installed coupled to three way switch 33 |
| 71 | first possible configuration of inventive dimmer 52 |
| 72 | second possible configuration of inventive dimmer 52 |
| 73 | third possible configuration of inventive dimmer 52 |
| 74 | fourth possible configuration of inventive dimmer 52 |
| 84 | power supply (internal to inventive dimmer 52) |
| 85 | first control circuit (internal to inventive dimmer 52) |
| 86 | second control circuit (internal to inventive dimmer 52) |
| 321 | first conductive path between dimmer 32 and three-way switch |
| 322 | second conductive path between dimmer 32 and three-way switch |
| 421 | first conductive path between dimmer 42 and three-way switch |
| 422 | second conductive path between dimmer 42 and three-way switch |
| 521 | first conductive path between dimmer 52 and three-way switch |
| 522 | second conductive path between dimmer 52 and three-way switch |
| H | AC line hot connection |
| N | AC line neutral connection |
| DH1 | first dimmer hot connection |
| DH2 | second dimmer hot connection |
| C1 | storage capacitor (internal to inventive dimmer 52) |
| D1-D8 | diodes (internal to inventive dimmer 52) |

DETAILED DESCRIPTION OF THE INVENTION

The present invention is designed to allow residential installers to use a single type lighting dimmer for either two-wire or three-wire applications, as well as in place of two-way or three-way switches.

MODE(S) FOR CARRYING OUT THE INVENTION

As described previously, present practice provides for lighting dimmers that may be installed serially with a load by connecting one active input wire H or in parallel with a load by connecting two active input wires H, N. Serial dimmers generally are used as replacements for switches in existing circuits and parallel dimmers are generally used in new or upgraded installations.

Figure 5:
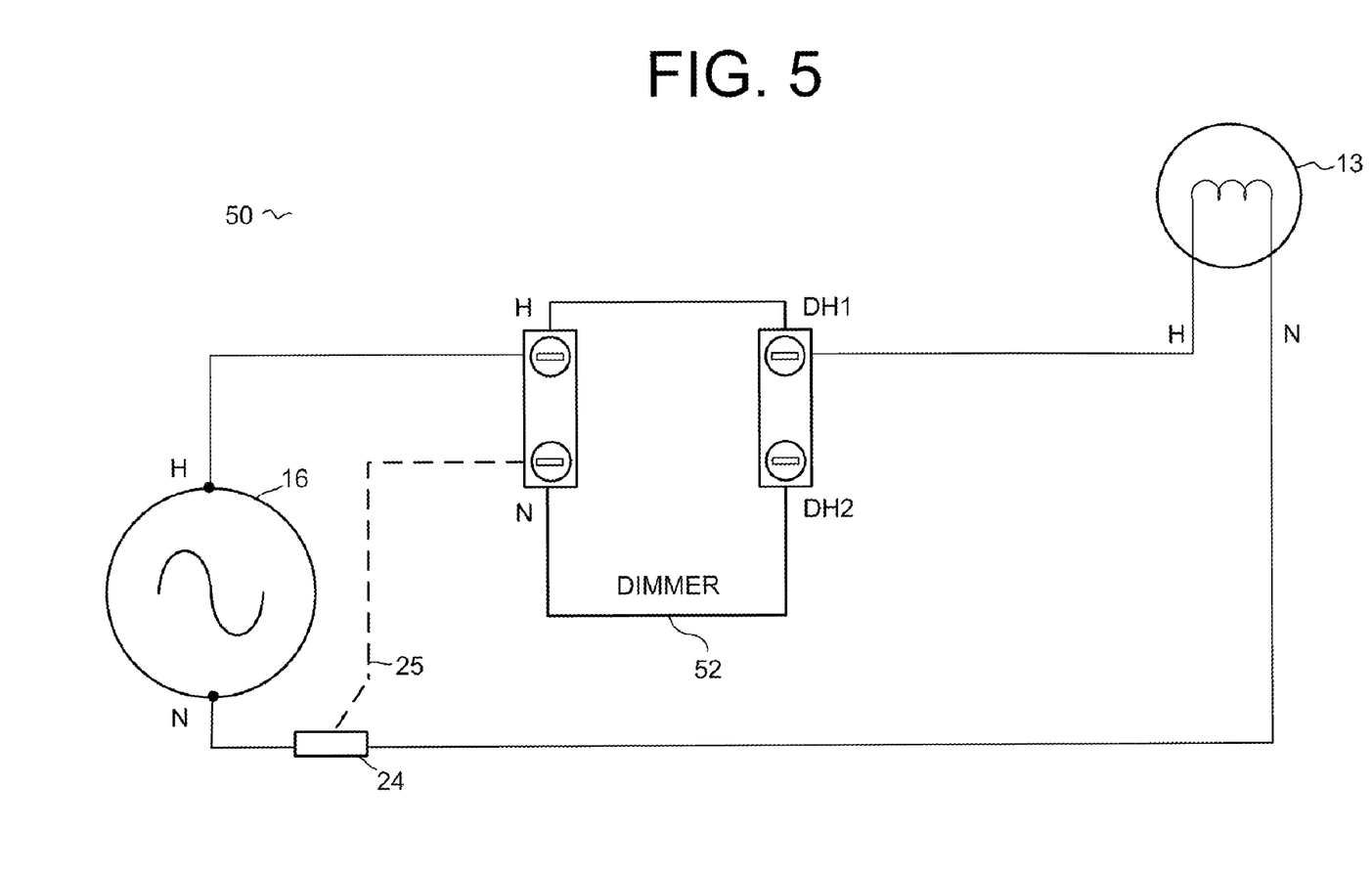
FIG. 5 shows the inventive dimmer operating in place of a two-way switch and adaptable to either serial or parallel installation without modification.

FIG. 5 shows the inventive dimmer 52, which is adaptable to either serial or parallel installation and as a replacement for both two-way and three-way switches in accordance with the present invention. The inventive dimmer 52 is installed serially by connecting the AC source 16 hot (H) wire to the dimmer 52 H connection and the lighting load 13 hot (H) wire to the inventive dimmer 52 DH connection.

The adaptable dimmer 52 is installed in parallel by connecting the AC source 16 hot (H) wire to the inventive dimmer 52 H connection, the lighting load 13 hot (H) wire to the inventive dimmer 52 DH connection, and a neutral wire 15, which is connected by a splice 14 to a residential lighting circuit, to the inventive dimmer 52 N connection. Advantageously, this provides a method to convert a residential lighting circuit from serial operation to parallel operation, such as in a future household renovation, by simply adding a neutral wire.

Figure 6:
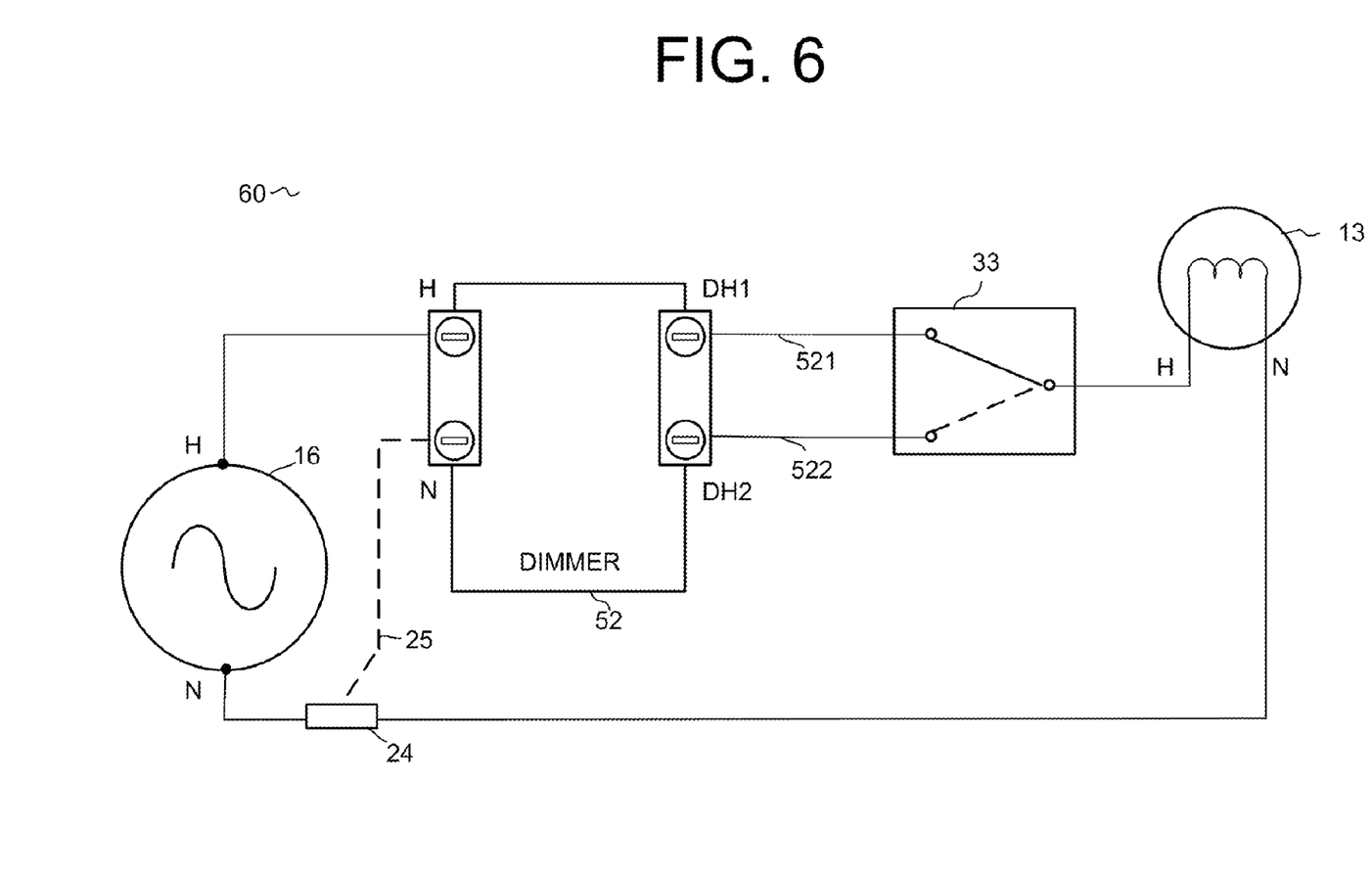
FIG. 6 shows inventive dimmer operating in place of a three-way switch and adaptable to either serial or parallel installation without modification.

FIG. 6 illustrates the inventive dimmer 52 operating in place of a three-way switch 33. The dimmer is installed either in serial or parallel in the manner described in the above paragraph. However, the dimmer now offers two conductive paths 521, 522 from the AC source hot (H) wire to the load hot (H) connection depending on the position of the three-way switch 33.

In a preferred embodiment, the inventive dimmer 52 H connection, DH connection, and N connection are screw terminals that are configured in a manner similar to a standard wall light switch.

Figure 7:
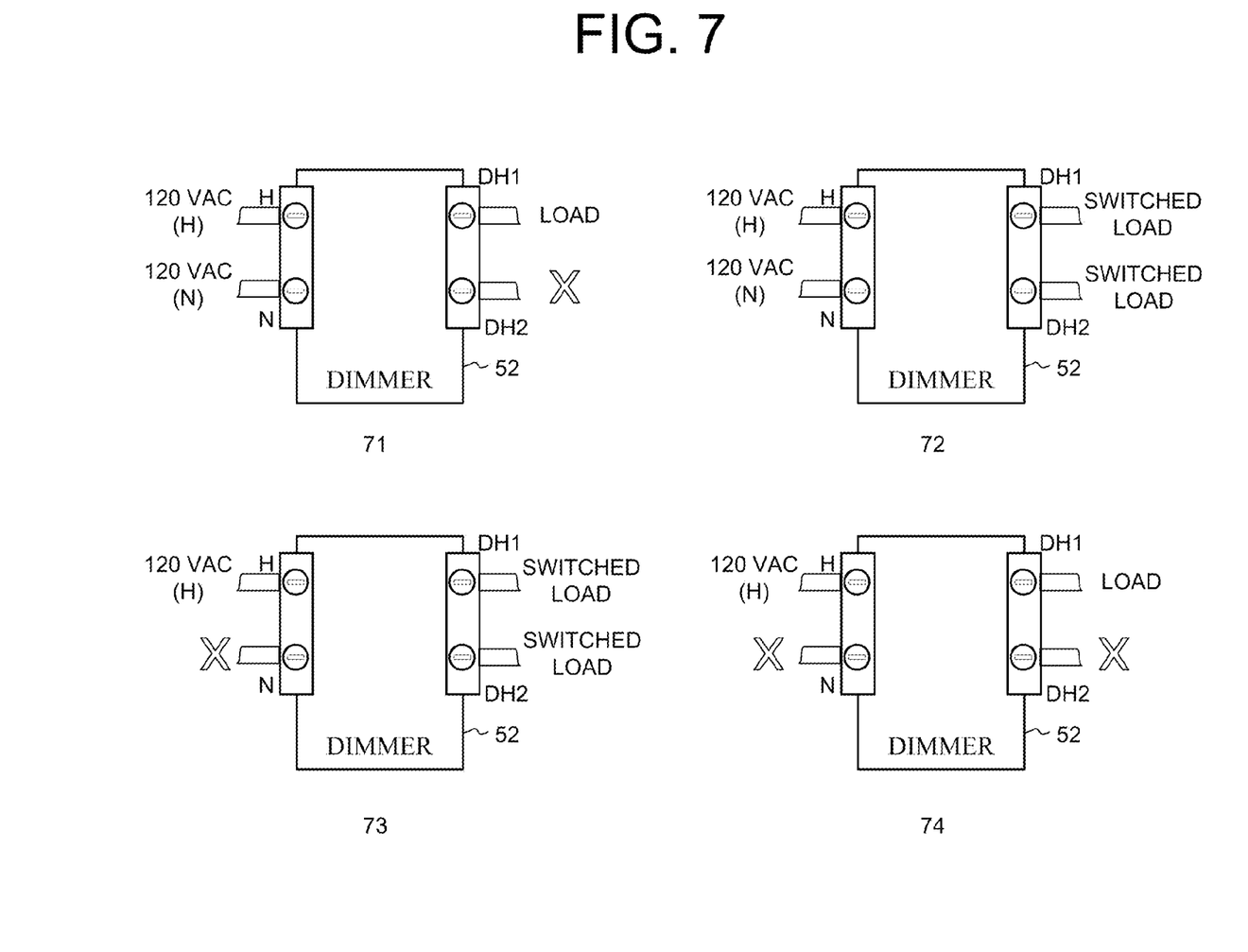
FIG. 7 shows the four possible wiring schemes of the inventive dimmer.

FIG. 7 illustrates the four possible configurations of my single-type inventive. In the first configuration 71, the power supply 84 internal to the dimmer is sourced in parallel with the load 13 and the dimmer 52 is being operated as a replacement for a two-way switch. In the second configuration 72, the dimmer 52 is again sourced in parallel but is now being operated in place of a three-way switch. The last two configurations illustrate the inventive dimmer installed in series. Configuration 3 73 shows the dimmer operating in place of a three-way switch and in the fourth configuration 74 the dimmer is operating in place of a two-way switch.

Figure 8:
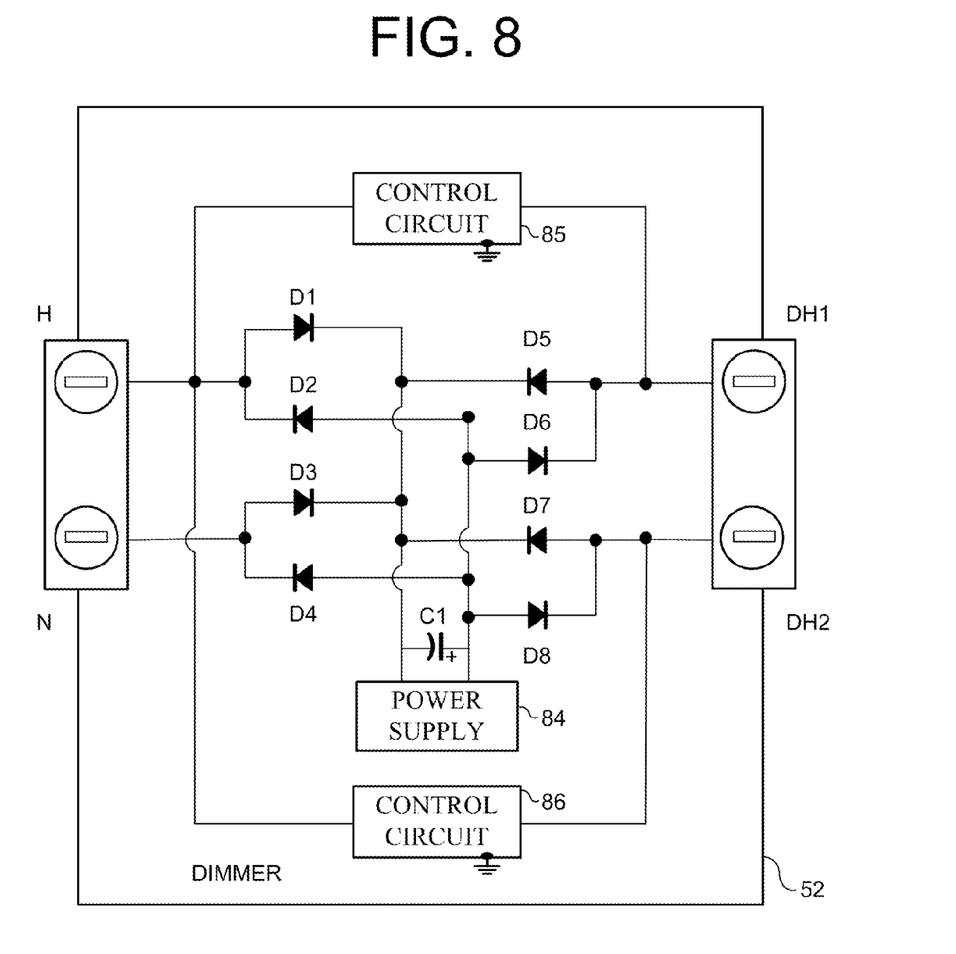
FIG. 8 further illustrates the operation and internal circuitry in one embodiment of the inventive dimmer.

Refer now to FIG. 8 which further demonstrates the operation of one embodiment of my inventive dimmer 52. When installed as a replacement for a two-way switch and sourced in series with the load, as shown in the fourth configuration xd of FIG. 7, the internal power supply 84 charges in both AC half-cycles through the lighting load 13 while keeping net DC current draw to a minimum.

During the positive AC half-cycle, while the first control circuit 85, such as a semiconductor switching device like a triac, is non-conducting, current flows from the AC source line hot (H) into the inventive dimmer 52 H connection. The positive half cycle current then flows through diode D1, power supply storage capacitor C1, through diode D6, then out of the inventive dimmer 52 DH1 connection. The positive half-cycle current finally flows through the lighting load 13 and returns to AC source line neutral (N). This illustrates, for one embodiment, the power supply storage capacitor C1 charging path during the positive AC half-cycle when the first control circuit 85 triac is off.

During the negative AC half-cycle, while the first control circuit 85, such as a semiconductor switching device like a triac, is non-conducting, current flows from the AC source line neutral (N) through the lighting load 13 and into the inventive dimmer 52 DH1 connection. The negative half-cycle current then flows through the diode D5, power supply storage capacitor C1 through diode D2, then out of the inventive dimmer 52 H connection. The negative half-cycle current finally returns to AC source line hot (H). This illustrates, for one embodiment, the power supply storage capacitor C1 charging path during the negative half-cycle when the first control circuit 85 triac is off.

When AC line neutral is available and the inventive dimmer 52 is installed in place of a two-way switch, as shown in the first configuration xa of FIG. 7, the inventive dimmer power supply 84 storage capacitor C1 can charge through the line cycle and without passing current through the lighting load 13.

During the positive AC half-cycle, current flows from the AC source 16 line hot (H) into the inventive dimmer 52 H connection. The positive half-cycle current then flows through diode D1, power supply 84 storage capacitor C1, through diode D3, then out of the inventive dimmer 52 N connection. The positive half-cycle current finally returns to AC source 16 line neutral (N). Power Supply 84 capacitor C1 charging occurs whenever the voltage at inventive dimmer 52 hot (H) to neutral (N) is greater that the voltage across capacitor C1 plus two forward diode drops (e.g. 1.4 volts for silicon diodes). Power Supply 84 capacitor C1 charging is not limited by the control circuit 85 switching devices being off or by the lighting load 13 being connected to the overall residential lighting circuit.

During the negative AC half-cycle, current flows from the AC source 16 line neutral (N) into the single-type dimmer 52 N connection. The negative half-cycle current then flows through diode D4, power supply 84 storage capacitor C1, through diode D2, then out of the inventive dimmer 52 H connection. The negative half-cycle current finally returns to AC source 16 line hot (H). Power Supply 84 capacitor C1 charging occurs whenever the voltage at inventive dimmer 52 neutral (N) to hot (H) is greater that the voltage across capacitor C1 plus two forward diode drops (e.g. 1.4 volts for silicon diodes). Power Supply 84 capacitor C1 charging is not limited by the control circuit 85 switching devices being off or by the lighting load 13 being connected to the overall residential lighting circuit.

Refer again to FIGS. 7 and 8. When the dimmer 52 is installed in place of a three-way switch 33 and the internal power supply 84 is connected in series with the load 13, as shown in configuration 3 73 of FIG. 7, there are two means for charging the internal power supply. If the three-way switch 33 provides a connection 521 through the inventive dimmer 52 DH1 connection, the first dimmer hot connection is active. During the positive AC half-cycle, while the first control circuit 85, such as a semiconductor switching device like a triac, is non-conducting, current flows from the AC source line hot (H) into the inventive dimmer 52 H connection. The positive half cycle current then flows through diode D1, power supply storage capacitor C1, through diode D6, then out of the inventive dimmer DH1 connection. The positive half-cycle current finally flows through the lighting load 13 and returns to AC source line neutral (N). This illustrates, for one embodiment, the first of two power supply 84 storage capacitor C1 charging paths during the positive AC half-cycle when the first control circuit 85 triac is off.

During the negative AC half-cycle, while the first control circuit 85, such as a semiconductor switching device like a triac, is non-conducting, current flows from the AC source line neutral (N) through the lighting load and into the inventive dimmer 52 DH1 connection. The negative half-cycle current then flows through the diode D5, power supply storage capacitor C1 through diode D2, then out of the inventive dimmer 52 H connection. The negative half-cycle current finally returns to AC source line hot (H). This illustrates, for one embodiment, the first of two power supply 84 storage capacitor C1 charging paths during the negative half-cycle when the first control circuit triac is off.

If the three-way switch 33 provides a connection 522 through the inventive dimmer 52 DH2 connection, the second dimmer hot connection is active. During the positive AC half-cycle, while the second control circuit 86, such as a semiconductor switching device like a triac, is non-conducting, current flows from the AC source line hot (H) into the inventive dimmer 52 DH2 connection. The positive half cycle current then flows through diode D1, power supply 84 storage capacitor C1, through diode D7, then out of the inventive dimmer 52 DH2 connection. The positive half-cycle current finally flows through the lighting load and returns to AC source line neutral (N). This illustrates, for one embodiment, the second possible power supply 84 storage capacitor C1 charging path during the positive AC half-cycle.

During the negative AC half-cycle, while the second control circuit 86, such as a semiconductor switching device like a triac, is non-conducting, current flows from the AC source line neutral (N) through the lighting load 13 and into the inventive dimmer 52 DH2 connection. The negative half-cycle current then flows through the diode D8, power supply storage capacitor C1 through diode D2, then out of the inventive dimmer 52 H connection. The negative half-cycle current finally returns to AC source line hot (H). This illustrates, for one embodiment, the second possible power supply 84 storage capacitor C1 charging path during the negative half-cycle.

When the single-type dimmer is installed in place of a three-wire switch 33 and a neutral wire is available for connection, as in the second configuration xb of FIG. 7, the three-way switch 33 position has no effect on the means to charge the internal power supply 84. The inventive dimmer 52 power supply 84 storage capacitor C1 can charge through the line cycle and without passing current through the lighting load 13.

During the positive AC half-cycle, current flows from the AC source 16 line hot (H) into the inventive dimmer 52 H connection. The positive half-cycle current then flows through diode D1, power supply 84 storage capacitor C1, through diode D3, then out of the inventive dimmer 52 N connection. The positive half-cycle current finally returns to AC source 16 line neutral (N). Power Supply 84 capacitor C1 charging occurs whenever the voltage at inventive dimmer 52 hot (H) to neutral (N) is greater that the voltage across capacitor C1 plus two forward diode drops (e.g. 1.4 volts for silicon diodes). Power Supply 84 capacitor C1 charging is not limited by the control circuit 85 86 switching devices being off or by the lighting load 13 being connected to the overall residential lighting circuit.

During the negative AC half-cycle, current flows from the AC source 16 line neutral (N) into the single-type dimmer 52 N connection. The negative half-cycle current then flows through diode D4, power supply 84 storage capacitor C1, through diode D2, then out of the inventive dimmer 52 H connection. The negative half-cycle current finally returns to AC source 16 line hot (H). Power Supply 84 capacitor C1 charging occurs whenever the voltage at inventive dimmer 52 neutral (N) to hot (H) is greater that the voltage across capacitor C1 plus two forward diode drops (e.g. 1.4 volts for silicon diodes). Power Supply 84 capacitor C1 charging is not limited by the control circuit 85 86 switching devices being off or by the lighting load 13 being connected to the overall residential lighting circuit.

Continue to refer to FIGS. 7 and 8. In one embodiment, my inventive dimmer 52 includes an AC line hot (H) connection, an AC line neutral (N) connection, a first dimmer hot (DH1) connection, a second dimmer hot connection (DH2), an internal power supply 84, a storage capacitor C1 associated with the power supply, a first control circuit 85, a second control circuit 86 and three-full wave rectifiers. It is contemplated that in certain embodiments, the storage capacitor C1 may be substituted with another type of energy storage device, such as a battery.

The first full-wave rectifier, comprising diodes D1, D2, D3, and D4, rectifies an alternating current (AC) input voltage present between the inventive dimmer 52 H and N connections and also provides a direct current output voltage across the energy storage device capacitor. The second full-wave rectifier, comprising diodes D1, D2, D5, and D6, rectifies an alternating current (AC) input voltage present between the inventive dimmer 52 H and DH1 connections and provides a direct current output voltage across the energy storage device capacitor C1. The third full wave rectifier, comprising diodes D1, D2, D7, D8, rectifies an alternating current (AC) input voltage present between the single-type dimmer and DH2 connections and provides a direct current output voltage across the energy storage device capacitor C1.

The direct current (DC) output voltage presented across capacitor C1 is both stored locally at capacitor C1 and used to drive power supply 84, which provides a local DC voltage, such as +5 VDC, which is used to power various circuitry within the inventive dimmer 52, including the control circuits 85 86. It is contemplated that the inventive dimmer 52 could include other circuitry such as display elements, network drivers, RF transmitters and receivers, and other logic and sensors.

Two advantages of the present inventive dimmer are that it is simple to reconfigure in the field and it can be used in multiple wiring schemes. Installers can now stock one single dimmer. For example, an installer utilizing the inventive dimmer will no longer need to have a stock of serially sourced dimmers for renovations and a separate stock of parallel dimmers for new installations and upgrades. Similarly the installer will not need to spend the time and effort inquiring beforehand whether dimmers compatible for use in place of two-way or three-way switches are required.

INDUSTRIAL APPLICABILITY

To solve the aforementioned problems the present invention includes a single-type-dimmer that can be wired in four distinct wiring configurations.

LIST OF ACRONYMS USED IN THE DETAILED DESCRIPTION OF THE INVENTION

The following is a list of the acronyms used in the specification in alphabetical order.

| | |
|---|---|
| C | capacitor |
| D | diode |
| DH | dimmer hot (variable voltage) |
| DH1 | first dimmer hot |
| DH2 | second dimmer hot |
| DPDT | double pole double throw (switch) |
| G | ground (safety ground) |
| H | hot conductor (120 VAC) |
| N | neutral conductor (120 VAC return) |
| SPST | single pole single throw (switch) |
| SPDT | single pole double throw (switch) |
| VAC | volts, alternating current |

Alternate Embodiments

Alternate embodiments may be devised without departing from the spirit or the scope of the invention such as embodiments including a variable dimmer knob and a switch where the knob establishes a preset dimming level and the switch controls the power ON/OFF.

What is claimed is:

1. A lighting dimmer (52) adaptable to four predefined wiring configurations, said dimmer comprising:
    (a) an AC line hot (H) connection functionally adapted for operation when said dimmer is wired in any of said four predefined wiring configurations;
    (b) an AC line neutral (N) connection functionally adapted for operation when said dimmer is wired in either a first (71) or a second (72) one of said four predefined wiring configurations;
    (c) a first dimmer hot (DH1) connection functionally adapted for operation when said dimmer is wired in any of said four predefined wiring configurations;
    (d) a second dimmer hot (DH2) connection functionally adapted for operation when said dimmer is wired in either the second (72) or a third (73) one of said four predefined wiring configurations;
    (e) an internal power supply (84);
    (f) an energy storage device (C1) associated with, and providing power to said internal power supply;
    (g) a first control circuit (85) powered by said internal power supply being switchably operable to provide either a conductive or a nonconductive electrical path between the AC line hot connection and the first dimmer hot connection;
    (h) a second control circuit (86) powered by said internal power supply being switchably operable to provide either a conductive or a nonconductive electrical path between the AC line hot connection and the second dimmer hot connection;
    (i) a first full-wave rectifier (D1, D2, D3, D4) adapted to rectify an alternating current input voltage present between the AC line hot connection and AC line neutral connection when
        (i) said dimmer is wired in either the first (71) or the second (72) one of said four predefined wiring configurations;
    (j) a second full wave rectifier (D1, D2, D5, D6) adapted to rectify an alternating current input voltage present between the AC line hot connection and the first dimmer hot connection when
        (i) said dimmer is wired in either the third (73) or a fourth (74) one of said four predefined wiring configurations,
        (ii) the first control circuit is providing a nonconductive electrical path between the AC line hot connection and the first dimmer hot connection, and
        (iii) an external load is connected between the first dimmer hot connection and AC line neutral return;
    (k) a third full-wave rectifier (D1, D2, D7, D8) adapted to rectify an alternating current input voltage present between the AC line hot connection and the second dimmer hot connection when
        (i) said dimmer is wired in the third (73) one of said four predefined wiring configurations,
        (ii) the second control circuit is providing a nonconductive electrical path between the AC line hot connection and the second dimmer hot connection, and
        (iii) an external load is connected between the second dimmer hot connection and AC line neutral return; and
    (l) wherein each of said first, second, and third full-wave rectifiers are connectively configured to provide a direct current output voltage across the energy storage device (C1).

2. The dimmer according to claim 1, wherein said energy storage device is a capacitor.

3. The dimmer according to claim 1, wherein the AC line hot connection, AC line neutral connection, the first dimmer hot connection, and the second dimmer hot connection each further comprise screw terminals.

4. The dimmer according to claim 1 wherein the first, second and third full-wave rectifiers operatively share two diodes.

5. A dimmer adaptable to four predefined wiring configurations comprising:
   (a) an AC line hot connection functionally adapted for operation when said dimmer is wired in any of said four predefined wiring configurations;
   (b) an AC line neutral connection functionally adapted for operation when said dimmer is wired in either a first or a second one of said four predefined wiring configurations;
   (c) a first dimmer hot connection functionally adapted for operation when said dimmer is wired in any of said four predefined wiring configurations;
   (d) a second dimmer hot connection functionally adapted for operation when said dimmer is wired in either the second or a third one of said four predefined wiring configurations;
   (e) a first power supply means adapted to draw electrical power from between the AC line hot connection and the AC line neutral connection being operable when
      (i) the dimmer is connected to the AC line hot connection and the AC line neutral connection;
   (f) a second power supply means adapted to draw electrical power from between the AC line hot connection and the first dimmer hot connection being operable when
      (i) an external load is connected between said first dimmer hot connection and the AC line neutral return, and
      (ii) the dimmer is not connected to the AC line neutral connection;
   (g) a third power supply means adapted to draw electrical power from between the AC line hot connection and the second dimmer hot connection being operable when
      (i) an external load is connected between said second dimmer hot connection and the AC line neutral return, and
      (ii) the dimmer is not connected to the AC line neutral connection;
   (h) a first control circuit powered by said first and second power means and operably connected between the AC line hot connection and the first dimmer hot connection; and
   (i) a second control circuit powered by said first and third means and operably connected between the AC line hot connection and the second dimmer hot connection.

6. The dimmer of claim 5 wherein said dimmer can be adapted for operation in any of said four predefined wiring configurations without the removal or addition of external jumpers.

* * * * *